United States Patent Office 3,050,082
Patented Aug. 21, 1962

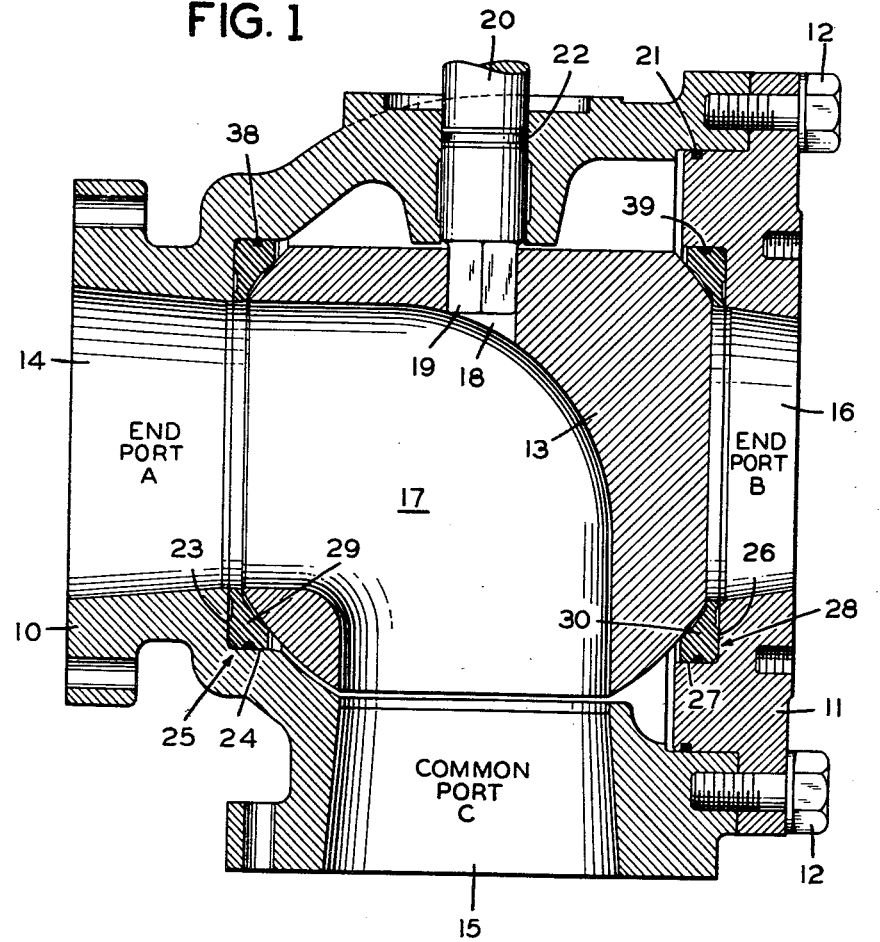

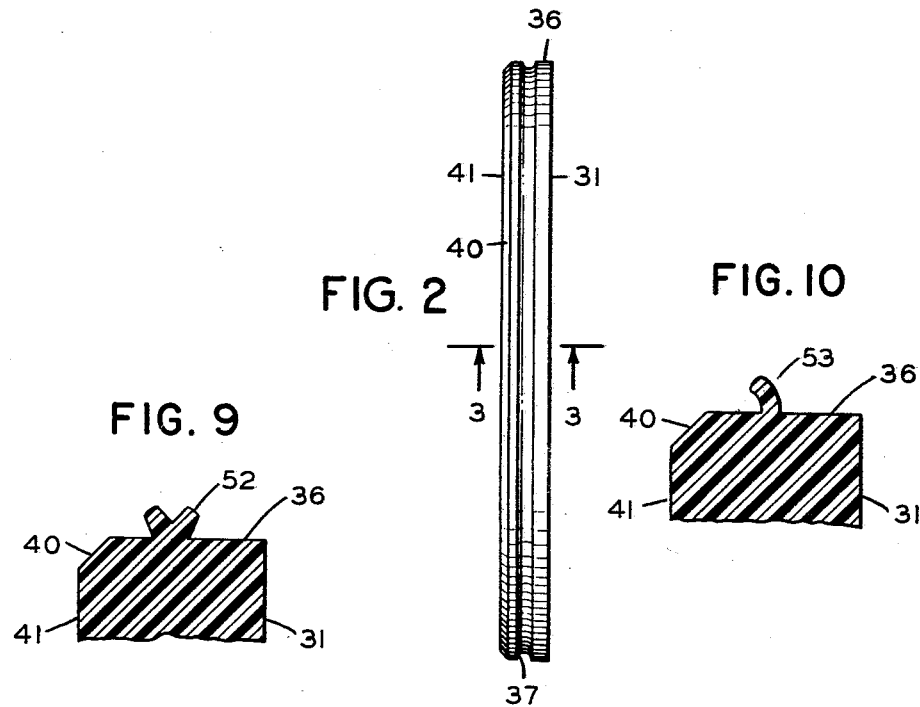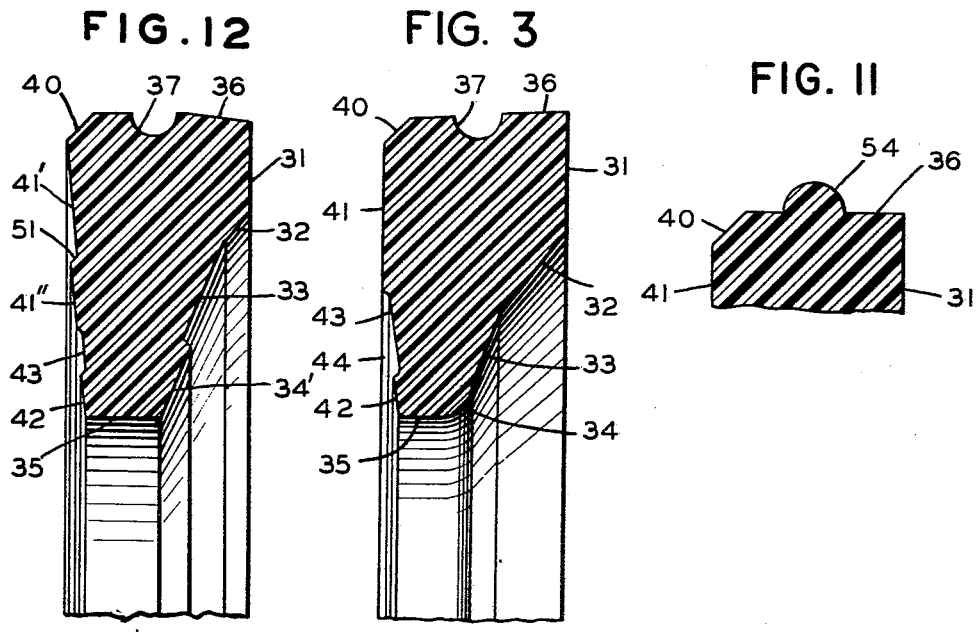

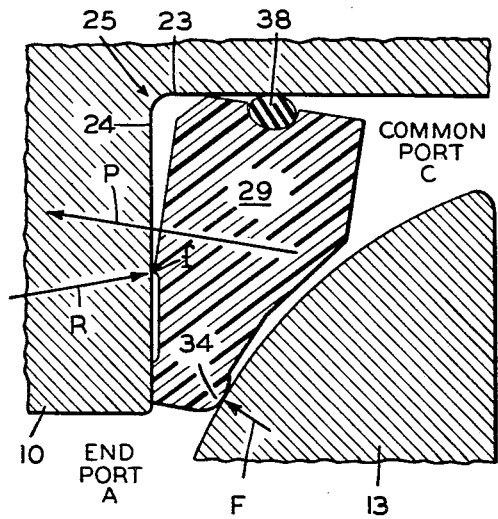
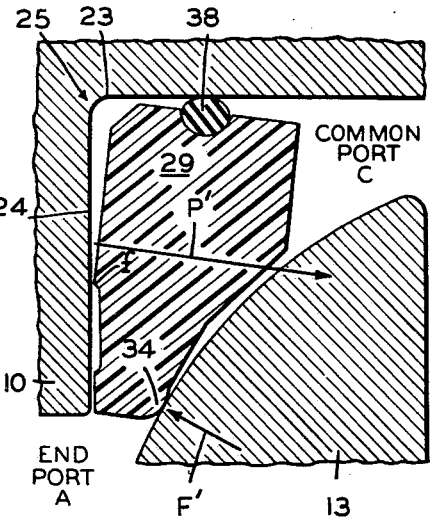
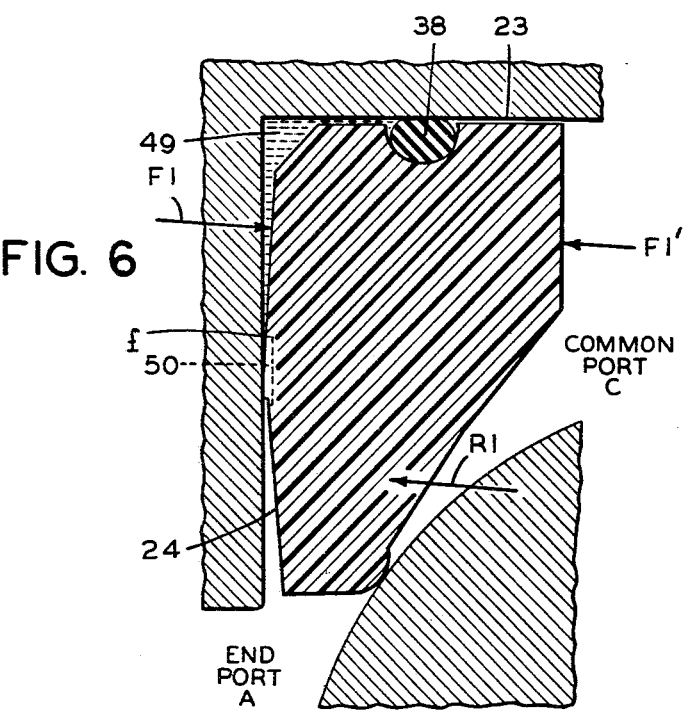

3,050,082
VALVE
Harold E. Bass, Ledyard, and Robert F. White, Stonington, Conn., assignors to General Dynamics Corporation, New York, N.Y., a corporation of Delaware
Filed Sept. 15, 1960, Ser. No. 56,292
3 Claims. (Cl. 137—625.11)

The present invention relates to valves and more particularly to ball valves intended to control the flow of liquids under substantial pressure.

This is a continuation-in-part of application Serial No. 826,048, filed July 9, 1959, now Patent No. 2,989,990, granted June 27, 1960, and is concerned primarily with three-way valves, i.e., valves having two end ports and a common port, and in which by suitable rotation of the ball the common port may be connected to either of the end ports or may be closed off from both end ports.

The principal object of the invention has been the provision of a novel and improved three-wall ball valve which can be used with advantage under severe operating conditions and over wide pressure ranges such as are encountered in sea water valves on submarines designed for deep submergence.

Another object of the invention has been the provision of a novel and improved seat seal especially adapted for use with three-way ball valves.

Other and further objects and features of the invention will appear from the following description taken in connection with the appended drawings, in which:

FIG. 1 is a longitudinal sectional view illustrating a three-way valve constructed in accordance with the invention;

FIG. 2 is a side elevational view of one of the seat seals of the valve of FIG. 1;

FIG. 3 is an enlarged partial sectional view of the seat seal of FIG. 2 taken along the line 3—3 of FIG. 2;

FIG. 5A is a schematic force diagram illustrating the sealing action in a three-way ball valve of the type shown in FIG. 1 with pressure from the common port;

FIG. 5B is a diagram similar to FIG. 5A but illustrating the condition of pressure from an end port;

FIG. 6 is a schematic force diagram for a modified seat seal of a three-way ball valve constructed in accordance with the invention;

FIG. 9 is a schematic diagram illustrating a further modified seat seal construction in accordance with the invention;

FIG. 10 is a view similar to FIG. 9 but showing another modification;

FIG. 11 is a view similar to FIGS. 9 and 10 showing still another modification;

FIG. 12 shows a still further modified seat seal construction.

Figure 4:
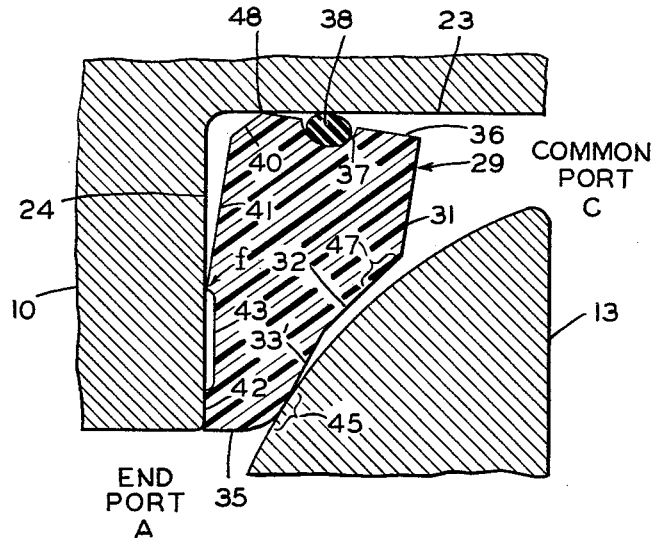
FIG. 4 is an enlarged partial sectional view of a seat and seat seal in accordance with the invention.

Referring now to the drawings, and more particularly to FIG. 1, there is shown a generally cylindrical valve body or housing 10, a generally cylindrical valve bonnet 11 connected to the valve body by means of peripherally spaced bolts 12, and a self-centering or floating ball 13 located in and substantially filling the cavity afforded within the valve body and bonnet. The valve body is provided with a generally cylindrical opening 14 forming an end port A and a similar opening 15 forming a common port C. The valve bonnet 11 is provided with a similar opening 16 forming an end port B. The end ports A and B are in axial alignment and are disposed at right angles with respect to the common port C.

The ball 13 is provided with a curved cylindrical passage 17 the ends of which are disposed at 90° with respect to each other. The common port C may be connected to either of the two end ports or closed off from both end ports by rotating the ball 13 about an axis concentric with the common port C so as to align the angle passage 17 of the ball to afford the desired communication or lack of communication. The ball 13 is provided with a square sided opening 18 adapted to accommodate a similarly shaped end 19 of a valve operating stem 20. The stem 20 acts in a hole provided in the top of the valve body 10 and may be rotated by any desired means (not shown) in order to effect rotation of the ball.

Suitable fluid pressure seals such as O rings are provided between mating surfaces of the valve body and bonnet and between the valve body and valve stem, as shown at 21 and 22.

The valve body is provided with a radially extending annular shoulder 23 and an axially extending annular shoulder 24 forming an annular valve seat 25. The valve bonnet is provided with a radially extending annular shoulder 26 and an axially extending annular shoulder 27 forming an annular valve seat 28 identical to the valve seat 25 but oppositiely disposed. The valve seats 25 and 28 accommodate annular seat seals 29 and 30, respectively. The seat seals 29 and 30 are identical but oppositely disposed so that each presents a corresponding face to the ball.

The seat seals are shown in detail in FIGS. 2 and 3. As shown in these figures, the front side of the seal (the side facing the ball) is formed by a vertical surface 31, an angled surface 32, a differently angled surface 33 and a raised annular surface or bead 34. If desired, the bead 34 may be omitted and the surface 33 rounded into a horizontal (axially extending) surface 35 forming the inner diameter of the seat seal. The diameter of the surface 35 corresponds to the adjacent ball passage and end port diameters.

The outer diameter of the seat seal is formed by a surface 36 which is angled inwardly slightly (e.g., 2°) toward the back side (the side remote from the ball). The surface 36 is provided with an annular arcuate slot 37 which is adapted to receive an O ring 38 (or 39), as shown in FIG. 1. Alternatively, the O ring slot may be provided in the valve seat surface 24 (or 27) and act against the surface 36 to afford sealing action as described below. The back portion of the surface 36 is chamfered as shown at 40.

The back side of the seat seal is formed by an outer annular vertical surface 41, an inner annular angled surface 42, and an annular recessed surface 43 forming an annular relief chamber 44 which affords a debris-removing pumping chamber.

The valve parts, other than the seat seals 25 and 28, may be made of any convenient materials. For example, for submarine sea valve service the ball, valve body and valve bonnet might be made from a nickel-copper alloy.

But the material from which the seat seals 25 and 28 are made should be chosen with particular care. Thus this material should have substantial tensile strength, substantial flexural stiffness and hardness and an ability to resist cold forming while nevertheless affording a good seal. The modulus of elasticity is preferably at least $0.2 \times 10^6$ pounds per square inch, and it is desirable that it be higher. A lower modulus of elasticity may be used for lower pressures. At the present time the best known material is nylon impregnated with molybdenum disulfide, sold under the designation "Nylatron GS" by Polymer Corporation of Pennsylvania, of Reading, Pennsylvania. Another example of a suitable material for the seat seals is a glass filled nylon with or without molybdenum disulfide impregnation, for example, the products sold by Fiberfill Corportion of Warsaw, Indiana, under the designation "Nylatron-G" and "Nylatron-G-MS," respectively. Still another example of a satisfactory material is a glass-reinforced nylon molding compound sold by Belding Corticelli Industries under the designation "BC I Nylon Resin LX–1115 F." This product exhibits a modulus of elasticity of about $1.13 \times 10^6$ p.s.i. and a tensile strength of 14,000 p.s.i. Another example of a material which can be used, although not considered to be as satisfactory as "Nylatron GS" is Kel-F" which is a polymer of trifluorochloroethylene sold by M. W. Kellogg Co.

Where the seat seal material is hygroscopic, it should be moisture conditioned to a substantial moisture equilibrium so that it will not swell appreciably or decrease in strength appreciably under operating conditions.

The basic operation of the seat seal will be described in connection with FIG. 4. For simplicity, this basic description will be similar to that described for a two-way valve in the aforementioned copending application, and will ignore the complexities introduced by the presence of three ports. A complete description of the valve operation will be set forth hereinafter, but for the present the end port A may be considered a downstream port toward which the ball 13 is urged in an axial direction by fluid in the line.

The seal 29 of FIG. 4 is similar to that of FIGS. 2 and 3 except that the lip 34 is omitted. Thus the surface 33 of FIG. 3, designated 33' in FIG. 4, rounds smoothly into surface 35 in FIG. 4, eliminating the protruding lip area.

FIG. 4 shows the ball 13 in position to close off end port A and bearing under load against seat seal 29. The valve is initially subjected to a suitable preload, as by tightening the bolts 12. The amount of tightening required to achieve a desired preload is not critical because the flexibility of the seat seals will accommodate considerable variation while maintaining a constant preload. In the preload condition (but with the valve closed), the ball 13 contacts front side bearing area 45 of surface 33', but does not contact the remaining area of surface 33' or surface 32. The bearing area 45 is preferably relatively small, but will be greater for higher values of preload. The amount of preload placed upon the seals is dependent upon the amount of wear and creep which the seals will undergo during their lives. Although the wearing rate tends to be more or less constant, the creep rate is greatest during the early life of the seals until the seal material becomes strain or work hardened.

With seals of the type shown in FIGS. 2 and 3, the front side bearing area lies along the curved surface or lip 34. For valves handling pressures in excess of 300 p.s.i. and having an operating life of 1,000 to 3,000 cycles, it has been found that the front side bearing area shown in FIG. 4, said surface occurring at the rounded junction of the surfaces 33' and 35, or, in FIG. 12, the flat protuberant area 34', is preferred to the area 34 shown in FIGS. 5A and 5B. The design shown in FIG. 12 is particularly beneficial since it offers a nearly constant size bearing area throughout the wear life of the seat seals thereby maintaining nearly constant operating torque throughout the operating life of the seat seals.

The rear or back side bearing area 42 of the seat seal would, under preload conditions, be spaced from the seat surface 24. This spacing (prior to preloading) is preferably equal to the sum of the manufacturing tolerances (maximum) of the corresponding portions of the valve seat, seat seal and ball multiplied by a factor up to about 3 to 4. The spacing decreases after preloading and may even substantially disappear with an appropriate accumulation of manufacturing tolerances. However, even if this dimension decreases substantially to zero under preload, from a sealing standpoint spacing still exists since fluid can easily pass by the bearing surface until a substantial load is applied.

By using shims (not shown) between the bonnet 11 and the valve body 10, manufacturing tolerances can be relaxed.

As the valve is closed through rotation of the ball 13, the seat seal 29 is subjected to a torsional twisting force transmitted thereto from the ball. This torsional twisting force may conveniently be considered as acting about a point $f$ as a fulcrum, although, strictly speaking, it would be more accurate to refer to twisting about the centroid or center of twist. Actually, the fulcrum is a circular line representing the locus of the various points $f$ about the back side of the seat seal, but it is convenient to consider the seal operation from the point of view of a single cross section. The seal operation is a summation of the operations of all of the cross sections.

The torsional twisting of the seat seal continues until the back side bearing area 42 makes a seating contact with the seat surface 24. This seating contact can occur at any desired proportion of full load pressure on the ball, but preferably the contact will occur when the fluid pressure is about $\frac{1}{10}-\frac{1}{2}$ of its rated full load value. The seat seal is, of course, subjected to a bending stress during the torsional pivoting, but this stress is relatively small because it does not increase with increasing load after the back side bearing area 42 makes seating contact with the seat surface 24. Hence the elastic limit of the seal material is not exceeded and there is no permanent deformation of the seal. Thus the valve may be caused to experience repeated cycles of operation and still maintain a good sealing action at low pressures as well as at high pressures. Excessive bending of the seat seal would tend to result in permanent deformation and hence in leakage at low pressures. At low pressures, sealing is afforded by contact between the ball and the seal in the area 45 and between the O ring 38 and the surface 24.

In the valve open position, no contact is afforded between the ball 13 and the seat seal surface 32. But, as the valve is closed, motion of the ball 13 under the fluid pressure and torsional twisting of the seat seal cause contact to occur within the area 47. The contact area increases with the load, the full contact area being in contact with the ball at full load. Preferably, contact between the ball 13 and the surface 32 occurs at substantially the same load as contact between the rear side bearing area 42 and the surface 24.

Because of the constraint afforded by the seat walls, the fulcrum point $f$ can move only in a vertical direction, and it moves a small distance radially toward the seat surface 23 along the wall 24 as load is placed on the seat by fluid pressure acting on the ball 13. During the twisting action the centroid or center of twist of the seat seal moves in a horizontal direction (toward the back side with increasing load) because of the vertical spacing between the centroid and the fulcrum point. If hoop stretching occurs, as discussed below, the centroid moves vertically toward the seat surface 23. Hoop stretching increases the elasticity of the seat seal, providing better sealing action between the ball and the seal, especially in high pressure valves.

The seat seal cross-sectional area should be sufficient to withstand the flexural stress resulting from torsional twisting of the seal, the compressive stress resulting from thrust of the ball upon the seal and the tensile stress resulting from hoop stretching of the seal, i.e., stretching in a radial direction. To prevent the hoop stresses within the seal from exceeding the elastic limit of the seal material, a portion of the outer periphery of the seal may be arranged to come into restraining or confining contact with the seat before the elastic limit of the seal is reached.

Such restraining contact is afforded by the point 48. The point 48 contacts the surface 23 because of hoop stretching and effectively limits radial expansion of the seat seal before the elastic limit of the seat seal material is exceeded. "Elastic limit," as used herein, should be considered as referring to a practical working stress which will afford a reasonable valve life.

Figure 7:
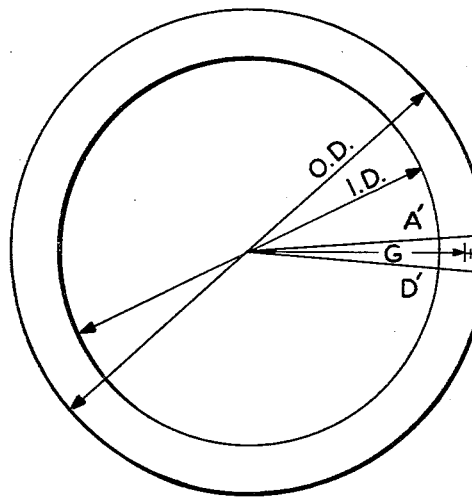
FIG. 7 is a schematic side elevational view of a seat seal in accordance with the invention with certain dimensions shown thereon for assisting in explaining the principles of the invention.

In the three-way valve of the invention the fulcrum point $f$ should be located radially inwardly of the centroid and preferably radially inwardly of the radial midpoint of the seal. The locations of these points will be seen by reference to FIGS. 7 and 8, where:

"O.D." equals the outside diameter of the seal (including the radial seal means, e.g., the O ring 38);

"I.D." equals the inside diameter of sealing contact between the ball and the seal ring;

"G" represents the radial midpoint of the seal and lies along a circle having a radius equal to I.D./2 plus (O.D.−I.D.)/4; and "CE" represents the centroid and may be considered as the centroid of projected segment A'B'D'E'.

The centroid CE is always located radially outwardly of the radial midpoint G and hence if the fulcrum $f$ is located radially inwardly of the radial midpoint G it will be located a substantial distance radially inwardly of the centroid CE. That portion of the seal located radially inwardly of the centroid CE should be sufficiently strong to resist the load imposed by internal pressure, so that the elastic limit of this portion of the seal will not be exceeded in service and surface 41 does not come into contact with surface 24.

The sealing action in the three-way ball valve of the invention will now be described in detail in connection with the schematic force diagrams of FIGS. 5A and 5B, which illustrate the seal 29, valve seat 25, and ball 13 of FIG. 1 under different pressure conditions. In these figures, the vector P equals the axial resultant pressure thrust caused by the differential valve pressure acting on the valve seat. The vector P' is equal to but opposite in direction to the vector P. The vector R equals the reaction of the P force on the valve body. The vectors F and F' are the reaction forces of the seal against the ball, causing sealing. The various vectors could be expressed numerically in pounds per circumferential inch.

The three-way ball valve seat seal must seal against pressure from both directions, i.e., with any combination of differential pressures across the three-valve ports, pressure must not leak past either of the two-valve seat seals while the valve is in the closed position or leak from C to A when the ball is open to B and vice versa. In accordance with the invention, the seat seals of the three-way valve afford tighter seals with increasing differential pressures.

Considering first the situation in which the end ports have equal low pressures with a high pressure in the common port, the valve sealing operation is illustrated in FIG. 5A. The high pressure in the common port seeks to leak out past the sealing lip 34 or the O ring 38. Initially, the seat seals have been preloaded between the valve body and the ball, causing the seat seals to rotate and pivot about their fulcrum points $f$. This action causes the seals to be "wound up" torsionally and results in a positive seal lip-ball bearing pressure. For a 7" ball valve, this pressure might amount, for example, to about 100–200 pounds per circumferential inch of seal lip.

When the differential pressure acts on the seal, the preload bearing pressure stops any low or initial pressure from leaking past the seal lip 34. The O ring 38 also stops pressure leakage. The differential pressure acting on the seal tends to force the main body of the seal longitudinally outward (vector P). However, since the fulcrum point in contact with the valve seat is located radially inward of the radial midpoint of the seal, the reaction force (vector R) causes the seal to pivot about the fulcrum point in a counter-clockwise direction (FIG. 5B). This causes the sealing lip 34 to try to advance further into the ball, increasing the sealing lip-ball bearing pressure (vector F). The greater the pressure differential the greater will be the sealing lip-ball bearing pressure. In other words, the higher the differential pressure the tighter will be the seal.

By moving the radial location of the fulcrum point the sealing lip-ball bearing pressure may be changed for a given pressure differential on the valve.

With both end ports at equal low pressure, the ball does not move but the seat seal lips (or corresponding plane surfaces in the absence of lips) just bear tighter and tighter as the pressure increases.

When the common port pressure is less than the end port pressures, but with the end port pressures equal, the situation illustrated in FIG. 5B prevails. Because of the initial torsional preload, any initial pressure trying to get past the sealing lips toward the common port is stopped by the preload seat seal lip-ball bearing pressure. The O ring also seals against leakage. As the differential pressure increases, the seat seal tends to move longitudinally toward the ball (vector P'), increasing the sealing pressure of the lip on the ball. Due to the wedging action of the seat seal against the ball, large differential pressures cause the seat seal to hoop stretch radially outward, keeping the O ring from blowing out as the seat seal rotates, which rotation will continue with increasing differential pressures until the second contact area of the front face of the seal contacts the ball. Thereafter, seat seal deformation is mostly hoop stretching, holding the O ring more tightly.

In this case the seat seal effectively moves toward the ball after the seal preload has been exceeded by differential pressure. The fulcrum point $f$ loses contact with the valve body. When the differential pressure is equalized (by opening the valve from one port and then to the other port), the seat seal returns to its original preload condition.

When the end ports A and B differ in pressure from each other and from the common port, the ball will move horizontally. If the pressure in end port A is greater than in the common port, which pressure in turn is greater than in end port B, then the seat seal next to port A will advance toward the ball (as in FIG. 5B) and cause positive sealing. The seat seal next to end port B, however, will act as described in connection with FIG. 5A and, in addition, the ball will transmit a torsional twisting force to this seal similar to that previously described on the assumption of a straight through valve, further increasing the sealing action of this seal. In this connection, the pressure differential across a straight through valve causes positive sealing on the downstream seat seal.

The operating torque increases exponentially with the diameter of the ball valve. However, by closing off one end port of the three-way valve of FIG. 1 (except for a vent to the other end port), an angle (90°) ball valve having a low operating torque results. In such a valve there would be no net ball-pressure area thrust and the only place when operating torque would arise would be in the self-sealing action, as described in connection with FIG. 5A. By locating the seal fulcrum point for optimum sealing and low torque, the operating torque will be a small fraction of that required for similar ball valves using conventional ball valve seal designs. For example, a typical 14" angle ball valve with a conventional two-way seal design and a given pressure differential might require a torque of the order of 200,000 inch pounds. A 14" angle ball valve of the type shown in FIG. 1 with one end port closed except for a vent to the other end port and acting against the same pressure differential might require a torque of the order of 40,000 inch pounds.

When the seat seal material is highly crystalline in nature, e.g., Nylatron GS, it is desirable that the O ring grooves 37 be machined with a full radius, as shown, rather than with sharp corners in order to prevent seal breakage under pressure by relieving stress concentrations.

In the valve of FIG. 1, when pressure appears at the common port after pressure application at the end ports, high pressure or incompressible fluid may be trapped between the fulcrum point *f* and the O ring seal 38, as indicated at 49 in FIG. 6. Such trapped fluid will exert a force F1 across the back face of the seal when the seal moves axially under action of the common port pressure. A force F1' will be exerted across the front face of the seal by pressure from the common port. The force F1' tends to neutralize the force F1 and sometimes may fully neutralize the effect of force F1 where equal pressures exist on both sides of the seal. In such case the force R1 exerted across the front side of the seal and tending to unload or move the seal away from the ball may cause leakage. This condition can be corrected by locating the fulcrum point closer to the end port opening, i.e., radially further inwardly of the centroid. However, this is undesirable since it lowers seal flexibility and reduces the operating life of the seal since under the pressure conditions shown in FIG. 5B surface 41 has a greater tendency to come into contact with surface 24. A preferable arrangement is to provide a fluid passage across the fulcrum area to prevent trapping of high pressure fluid on the back side of the seal. Such a passage is shown at 50 in FIG. 6. A series of spaced slots may be provided. Another alternative is to allow the O ring 38 to extrude out a predetermined amount, thus decreasing the pressure on the back side of the seal by increasing the volume of the chamber 49 containing this fluid.

Figure 8:
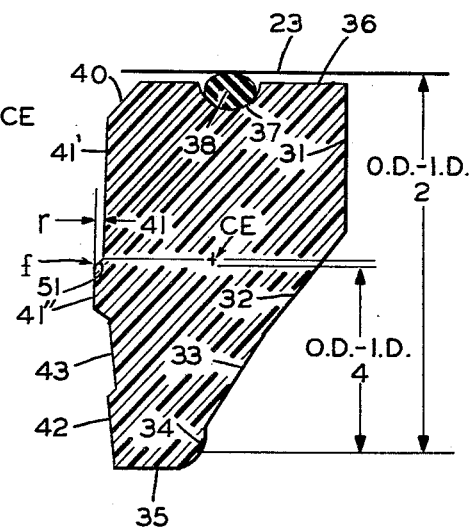
FIG. 8 is a schematic diagram illustrating another modified seat seal of a three-way ball valve constructed in accordance with the invention.

To prevent the fulcrum point *f* from reaching a radial outward position greater than desired (as by manufacturing tolerances or hoop stretching or distortion under pressure conditions), the surface 41 may be provided with a recess, as shown in FIG. 8. The recessed portion 41' of the seal surface 41 is separated from the portion 41'' by a shoulder 51, the axial extent of which is designated by the dimension "r."

Should the fulcrum point *f* be located radially outward of the centroid, leakage will occur when the horizontal (axial) component of the reaction force multiplied by the fulcrum-centroid spacing equals the moment of preload imposed on the seal.

It will generally be preferable to provide the radial sealing means represented by the O ring 38 as a separate sealing member acting with but not integral with the seat seal ring. However, in some cases it may be desirable to make this radial sealing means integral with the seat seal ring. Examples of such radial sealing means in integral form are shown in FIGS. 9, 10 and 11 at 52, 53 and 54, respectively.

The back side of the seat seal shown in FIG. 12 is similar to the back side of the seat seal shown in FIG. 8 except, however, that the seat seal of FIG. 12 is shown in its free state, i.e., without any imposed preload.

The invention has been described in connection with a floating ball type of valve construction. However, the principles and structure of the invention can be applied with advantage to ball valves in which the ball is trunnion mounted.

While the invention has been described in connection with specific embodiments thereof and in specific uses, various modifications thereof will occur to those skilled in the art without departing from the spirit and scope of the invention as set forth in the appended claims.

What is claimed is:

1. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports; said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having a substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area under substantial load conditions urging said ball and said seal ring into contact, said rear face extending radially and generally outwardly from said inner diameter, said rear face having a circular ring located between said inner diameter and the centroid of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said axially extending surfaces under all load conditions on said front face by torsional twisting of said seal ring about said fulcrum; and separate sealing means affording sealing contact between said outer diameter of each of said seal rings and a respective one of said axially extending surfaces under all load conditions, said separate sealing means for each of said seal rings comprising a lip integral with said seal ring and projecting radially from said outer diameter intermediate said front and back faces.

2. A valve, comprising a valve housing having first and second axially aligned end ports and a common port; a rotatable ball disposed in the space within said housing and having a fluid passage arranged in a first rotational position of said ball to provide communication between said common port and said first end port only, in a second rotational position of said ball to provide communication between said common port and said second end port only, and in a third rotational position of said ball to prevent communication between said common port and both of said end ports; said housing having an annular valve seat adjacent and concentric with each of said end ports, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area under substantial load conditions urging said ball and said seal ring into contact, said rear face extending radially and generally outwardly from said inner diameter, said rear face having a circular ring located between said inner diameter and the centroid of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum, said rear face between said circular ring and said outer diameter being recessed axially inwardly of said circular ring; and separate sealing means affording sealing contact between said outer diameter of each of said seal rings and a respective one of said axially extending surfaces under all load conditions.

3. A valve, comprising a valve housing having first and second ports having axes disposed at substantial angles; a rotatable ball disposed in the space within said housing and having a first fluid passage arranged in a first rotational position of said ball to provide communication between said ports, and a second rotational position of said ball to prevent communication between said ports; said housing having a pair of annular valve seats concentric with one of said ports, one of said valve seats being adjacent said one port and the other valve seat being axially spaced therefrom, each of said seats comprising an annular radially extending surface and an annular axially extending surface; a pair of annular seat seal rings each disposed in one of said seats and arranged to hold said ball therebetween, said seal rings being formed from a material having substantial flexural stiffness and hardness and a relatively high modulus of elasticity, each of said seal rings having an inner diameter corresponding to the diameter of said first passage, an outer diameter corresponding to the diameter of said axially extending surface, a rear face, a front face extending radially and inwardly from said inner diameter and arranged to contact said ball only over a first limited annular area adjacent said inner diameter under preload conditions and over a limited annular region including said first area and a second limited annular area under substantial load conditions urging said ball and said seal ring into contact, said second area being radially and inwardly spaced from said first area, said rear face extending radially and generally outwardly from said inner diameter, said rear face having a circular ring located between said inner diameter and the radial midpoint of said seal ring, said circular ring being arranged to contact said radially extending surface as a fulcrum when load is exerted on the front face of said seal ring, said rear face having an annular bearing area adjacent said inner diameter and axially spaced from said radially extending surface under preload conditions but contacting said radially extending surface under substantial load conditions on said front face by torsional twisting of said seal ring about said fulcrum, said rear face between said circular ring and said outer diameter being recessed axially inwardly of said circular ring; and separate sealing means affording sealing contact between said outer diameter of each of said seal rings and a respective one of said axially extending surfaces under all load conditions, said separate sealing means for each of said seal rings comprising a lip integral with said seal ring and projecting radially from said outer diameter intermediate said front and back faces.

References Cited in the file of this patent
UNITED STATES PATENTS

| | | |
|---|---|---|
| 2,297,161 | Newton | Sept. 29, 1942 |
| 2,558,260 | Maky | June 26, 1951 |
| 2,661,926 | Resek | Dec. 8, 1953 |
| 2,762,601 | Clade | Sept. 11, 1956 |
| 2,788,016 | Scherer | Apr. 9, 1957 |
| 2,858,098 | Sanctuary | Oct. 28, 1958 |
| 2,890,856 | Clade | June 16, 1959 |

UNITED STATES PATENT OFFICE
CERTIFICATE OF CORRECTION

Patent No. 3,050,082

August 21, 1962

Harold E. Bass et al.

It is hereby certified that error appears in the above numbered patent requiring correction and that the said Letters Patent should read as corrected below.

Column 1, line 20, for "three-wall" read -- three-way --; column 2, line 29, for "oppositiely" read -- oppositely --; column 3, line 16, for "is Kel-F" which" read -- is "Kel-F" which --; column 8, line 31, for "axially extending surfaces under all" read -- radially extending surface under substantial --; same column 8, lines 31 and 32, for "condiconditions" read -- conditions --; column 9, line 17, after "and" insert -- in --.

Signed and sealed this 11th day of December 1962.

(SEAL)
Attest:

ERNEST W. SWIDER
Attesting Officer

DAVID L. LADD
Commissioner of Patents